US011322277B2

(12) United States Patent
Kiser et al.

(10) Patent No.: US 11,322,277 B2
(45) Date of Patent: May 3, 2022

(54) CABLE CHANGER AND METHOD FOR LOCKING THE HEIGHT OF A CABLE GUIDE THAT IS HEIGHT-ADJUSTABLE RELATIVE TO A CABLE FEED APPARATUS

(71) Applicant: Komax Holding AG, Dierikon (CH)

(72) Inventors: Markus Kiser, Büren (CH); Adrian Gisler, Eschenbach (CH); Martin Stocker, Küssnacht (CH)

(73) Assignee: KOMAX HOLDING AG, Dierikon (CH)

( * ) Notice: Subject to any disclaimer, the term of this patent is extended or adjusted under 35 U.S.C. 154(b) by 285 days.

(21) Appl. No.: 16/515,186

(22) Filed: Jul. 18, 2019

(65) Prior Publication Data

US 2020/0035384 A1 Jan. 30, 2020

(30) Foreign Application Priority Data

Jul. 30, 2018 (EP) .................................... 18186379

(51) Int. Cl.

| | |
|---|---|
| ***B23P 19/00*** | (2006.01) |
| ***H01R 43/00*** | (2006.01) |
| ***H01B 13/00*** | (2006.01) |
| ***B65H 57/00*** | (2006.01) |
| ***H01B 13/012*** | (2006.01) |
| ***H01R 43/052*** | (2006.01) |

(52) U.S. Cl.
CPC ......... *H01B 13/0036* (2013.01); *B65H 57/00* (2013.01); *H01B 13/01209* (2013.01); *H01R 43/052* (2013.01)

(58) Field of Classification Search
CPC ............ H01R 43/052; H01B 13/01209; H01B 13/0036; B65H 57/00
See application file for complete search history.

(56) References Cited

U.S. PATENT DOCUMENTS 4,819,533 A 4/1989 Wollermann et al.
6,041,991 A * 3/2000 Mehri .................... B65H 51/32 226/110

(Continued)

FOREIGN PATENT DOCUMENTS

DE 19609326 A1 9/1997
EP 1213800 B1 7/2004

*Primary Examiner* — Paul D Kim
(74) *Attorney, Agent, or Firm* — William J. Clemens; Shumaker, Loop & Kendrick, LLP

(57) ABSTRACT

A cable changer includes a cable guide for retaining a plurality of cables at different heights, and a cable feed apparatus for feeding one of the cables to a cable processing machine, the height of the cable guide being adjustable relative to the cable feed apparatus, such that the cable feed apparatus can feed different cables of the cable guide to the cable processing machine depending on the height of the cable guide relative to the cable feed apparatus. The cable guide has height alignment elements and the cable feed apparatus has height determination elements that are complementary to the height alignment elements, the height alignment elements and the height determination elements locking the cable guide at one of a plurality of specified heights relative to the cable feed apparatus when the height determination elements are connected to some of the height alignment elements.

13 Claims, 5 Drawing Sheets

(56) References Cited

U.S. PATENT DOCUMENTS

| | | | | |
|---|---|---|---|---|
| 6,425,473 | B1 * | 7/2002 | Meisser | H01R 43/052 198/346.2 |
| 6,662,987 | B2 * | 12/2003 | Emi | H01R 43/28 140/147 |
| 10,476,244 | B2 * | 11/2019 | Blum | H01R 43/052 |

* cited by examiner

CABLE CHANGER AND METHOD FOR LOCKING THE HEIGHT OF A CABLE GUIDE THAT IS HEIGHT-ADJUSTABLE RELATIVE TO A CABLE FEED APPARATUS

FIELD

The present invention relates to a cable changer and a method for locking the height of a cable guide that is height-adjustable relative to a cable feed apparatus.

BACKGROUND

Cable changers are known for example from EP 1 213 800 B1. Cable changers of this kind allow for the production of partial cable harnesses having different cables. The cable changers store a plurality of different cables (e.g. different cross sections, insulation color, insulation material, etc.) in a cable guide, such that the cable required in each case can be automatically fed to the processing stations of a cable processing machine by means of a cable feed apparatus. The remaining cables in the cable changer are usually secured by clamps. In order to feed a specific cable to the processing stations of the cable processing machine, the cable changer moves into the corresponding height position (position in the Z-direction) of the cable guide. The cable alignment unit and the cable drive of the cable feed apparatus are attached to the cable. The clamps of the desired cable are opened by means of motorized pins or pneumatic cylinders, such that the corresponding cable can be fed to the cable processing machine by means of the cable feed apparatus. The production of the single wire for the partial cable harness can begin thereafter.

A disadvantage thereof is that the corresponding height position cannot be optimally reached or set under unfavorable circumstances, i.e. a discrepancy or difference exists between the desired or set height position of the cable guide relative to the cable feed apparatus, and the actual height position of the cable guide relative to the cable feed apparatus. This discrepancy or this difference may lead to problems in manipulating or handling the cable in the cable feed apparatus, and/or to problems in manipulating or handling the cable in the cable processing machine.

There may inter alia be a need for a cable changer or a method in which or by means of which a height-adjustable cable guide can be arranged precisely, at different specified heights, relative to the cable feed apparatus, in a technically simple manner.

SUMMARY

According to a first aspect of the invention, a cable changer is proposed that comprises a cable guide for retaining a plurality of cables at different heights, and a cable feed apparatus for feeding one of the cables of the cable guide to a cable processing machine, the height of the cable guide being adjustable relative to the cable feed apparatus such that the cable feed apparatus can feed different cables of the cable guide to the cable processing machine depending on the height of the cable guide relative to the cable feed apparatus, characterized in that the cable guide comprises height alignment elements and the cable feed apparatus comprises height determination elements that are complementary to the height alignment elements, the height alignment elements and the height determination elements being designed such that the cable guide is locked at one of a plurality of specified heights, relative to the cable feed apparatus, when the height determination elements are connected to some of the height alignment elements.

An advantage thereof is that the height-adjustable cable guide can typically be arranged and locked in a precise manner, at different heights, relative to the cable feed apparatus. The height of the cable that is to be fed to the cable processing machine can thus typically be set, relative to the cable feed apparatus, in a very precise manner. As a result, after locking of the cable guide by means of the height determination elements and the height alignment elements, the difference or the discrepancy between the desired or set height position of the cable guide or of the cable that is retained or guided by the cable guide, relative to the cable feed apparatus, is generally very small or very minor or even no longer present. Therefore, generally little or no manipulation difficulty results when manipulating or handling the cable using the cable feed apparatus and/or when feeding the cable to the cable processing machine by means of the cable feed apparatus, since the height of the cable relative to the cable feed apparatus is precisely set or known. A further advantage is that the desired height typically has to be reached or set only at a degree of accuracy that is such that the height alignment elements lock together with the height determination elements of the desired height, and not with the height determination elements of a different height.

According to a second aspect of the invention, a method for locking the height of a cable guide that is height-adjustable relative to a cable feed apparatus, to the cable feed apparatus, is proposed, the cable guide being designed for retaining a plurality of cables at different heights, the cable feed apparatus being designed for feeding one of the cables of the cable guide to a cable processing machine, the height of the cable guide being adjustable relative to the cable feed apparatus such that the cable feed apparatus can feed different cables of the cable guide to the cable processing machine depending on the height of the cable guide relative to the cable feed apparatus, the method comprising the following steps: —setting a height of the cable guide relative to the cable feed apparatus; and —connecting height determination elements of the feed apparatus to height alignment elements of the cable guide in order to lock the cable guide at a specified height, relative to the cable feed apparatus.

An advantage of the method is that the height-adjustable cable guide can typically be arranged and locked in a precise manner, at a specified height, relative to the cable feed apparatus. The height of the cable that is to be fed to the cable processing machine is thus generally set, relative to the cable feed apparatus, in a very precise manner. As a result, after locking of the cable guide by means of the height determination elements and the height alignment elements, the difference or the discrepancy between the desired or set height position of the cable guide or of the cable that is retained or guided by the cable guide, relative to the cable feed apparatus, is typically very small or very minor or even no longer present. Therefore, generally little or no manipulation difficulty results when manipulating the cable using the cable feed apparatus and/or when feeding the cable to the cable processing machine by means of the cable feed apparatus, since the height of the cable relative to the cable feed apparatus is precisely set or known. A further advantage is that the desired height typically has to be reached or set only at a degree of accuracy that is such that the height alignment elements lock together with the height determination elements of the desired height, and not with the height determination elements of a different height.

Possible features and advantages of embodiments of the invention can be considered, inter alia and without limiting the invention, to be based on the concepts and findings described in the following.

According to an embodiment of the cable changer, the height alignment elements of the cable guide comprise a plurality of recesses that are arranged at different heights, and the height determination elements of the cable feed apparatus comprise two projections, in particular the height determination elements of the cable feed apparatus consist of two projections. An advantage thereof is that it is typically possible to establish a particularly secure connection between the cable guide and the cable feed apparatus. Moreover, the height alignment elements generally do not impede the height adjustment of the cable guide, since the height alignment elements to not protrude from the cable guide. The height adjustment of the cable guide relative to the cable feed apparatus can thus generally be performed in a technically particularly simple and reliable manner.

According to an embodiment of the cable changer, the cable feed apparatus further comprises a labeling means for labeling the cable that is fed from the cable feed apparatus to the cable processing machine. An advantage thereof is that the cable can typically be labelled in a technically simple manner and, owing to the precisely known or precisely set height position of the cable relative to the cable feed apparatus, in a particularly reliable or precise manner. Furthermore, cables having a particularly small cross section (e.g. of less than 2 mm) can generally be labelled such that people can read the labeling without aids. Furthermore, it is in general possible to ensure that the labeling of the cable extends precisely, along the longitudinal axis thereof, such that it is particularly easy for a person and/or a machine to read out the cable labeling.

According to an embodiment of the cable changer, the cable guide comprises a reversibly compressible compensation connection element, in particular an elastomer member, the compensation connection element being designed and arranged such that the compensation connection element can compensate height differences between the cable guide and the cable feed apparatus when locking the cable guide to the cable feed apparatus. As a result, height differences can usually be compensated in a technically simple manner, when locking the cable guide to the cable feed apparatus. Therefore, typically no mechanical stresses arise in the cable guide and/or in the cable feed apparatus when locking the cable guide to the cable feed apparatus. As a result of this compensation of small discrepancies in the height between the actual height position after locking and the height position set prior to locking, of the cable guide relative to the cable feed apparatus, after locking the cable guide is typically always located in the set height position, without mechanical stresses arising in the height determination elements or in the height alignment elements.

According to an embodiment of the cable changer, the height alignment elements and the height determination elements are arranged on just one side of the cable guide. As a result, over determination of the height position of the cable guide relative to the cable feed apparatus, in the locked height position, is generally prevented, and therefore the occurrence of mechanical stresses is prevented in a technically simple manner.

According to an embodiment of the cable changer, the height determination elements of the cable feed apparatus are arranged at two mutually spaced positions, a height adjustment apparatus for changing the height of the cable guide relative to the cable feed apparatus, when the height determination elements are not connected to the height alignment elements, being arranged between the two mutually spaced positions. As a result, the cable retained by the cable guide can generally be oriented particularly simply in a direction that corresponds to the feed direction of the cable feed apparatus. Tilting of the cable guide relative to the cable feed apparatus is generally reliably prevented thereby.

According to an embodiment of the cable changer, the height of each recess of the height alignment elements is limited by two cylindrical pins, the cable guide being locked to the cable feed apparatus with respect to height when the height determination element is received between two cylindrical pins. It is thus typically possible to lock the cable guide to the cable feed apparatus in a specified height position in a technically simple and particularly precise manner. Furthermore, the height determination elements can generally slide into the height alignment elements, over the lateral surface of the cylindrical pins, as a result of which slight height differences between the set height position of the cable guide relative to the cable feed apparatus, and the desired height position of the cable guide relative to the cable feed apparatus can be compensated or minimized. The height position of the cable guide relative to the cable feed apparatus can typically change during the sliding or slipping of the height determination elements into the height alignment elements, over the lateral surface of the cylindrical pins.

According to an embodiment of the cable changer, one of the height determination elements is part of a cable alignment station of the cable feed apparatus for aligning the cable, and one of the height determination elements is part of a cable drive for conveying the cable, the height determination elements being connected to some of the height alignment elements, in a closed state of the cable alignment station and/or in a closed state of the cable drive of the cable guide on the cable feed apparatus, such that the cable guide is locked to the cable feed apparatus with respect to height. An advantage thereof is that the cable guide generally does not have to comprise any active elements for locking the height of the cable guide, but instead the locking in a height position can be performed by the cable feed apparatus. As a result, in general, the height determination elements are connected to the height alignment elements of the desired height, and thus the cable guide is aligned and locked at the desired height, in a quasi automatic manner when the cable alignment station or the cable drive for feeding the cable to the cable processing machine by means of the cable feed apparatus is closed.

According to an embodiment of the cable changer, front height alignment elements of the height alignment elements and rear height alignment elements of the height alignment elements are arranged between front cable clamps for clamping a portion of the cable and rear cable clamps for clamping a portion of the cable. An advantage thereof is that the relevant cable can generally be clamped by and released from the cable guide in a particularly reliable manner.

According to an embodiment of the method, locking with respect to height, between the height determination elements and the height alignment elements, is performed by closing straightening roller jaws of a cable alignment station of the cable feed apparatus and by closing a cable drive of the cable feed apparatus. An advantage thereof is that the cable guide does not have to comprise any active elements for locking the height of the cable guide, but instead the locking in a height position is performed by the cable feed apparatus. As a result, in general, the height determination elements are connected to the height alignment elements of the desired height, and thus the cable guide is aligned and locked at the desired height, in a quasi automatic manner when the cable alignment station or the cable drive for feeding the cable to the cable processing machine by means of the cable feed apparatus is closed.

According to an embodiment of the method, the cable is labelled, using a labeling means of the cable feed apparatus, prior to the cable being fed to the cable processing machine. An advantage thereof is that the cable can generally be labelled in a particularly precise manner, since the height of the cable guide, and therefore of the cable, relative to the cable feed apparatus is precisely set. It is thus typically possible to apply the label to the cable in particular such that the label can be read by a person and/or a machine, e.g. to apply the label by means of a laser.

The term "different cables" can in particular mean that the cables are not identical to one another. However, the cables can be structurally equivalent to one another.

It is noted that some of the possible features and advantages of the invention are described herein with reference to different embodiments of the cable changer and/or of the method for locking the height of a cable guide that is height-adjustable relative to a cable feed apparatus. A person skilled in the art will recognize that the feature can be combined, adjusted or exchanged in a suitable manner, in order to arrive at further embodiments of the invention.

Embodiments of the invention will be described in the following with reference to the accompanying drawings, neither the drawings nor the description being intended to be interpreted as limiting the invention.

The figures are merely schematic and are not to scale. Identical reference signs in the different figures denote identical or functionally identical features.

DETAILED DESCRIPTION

Figure 1:
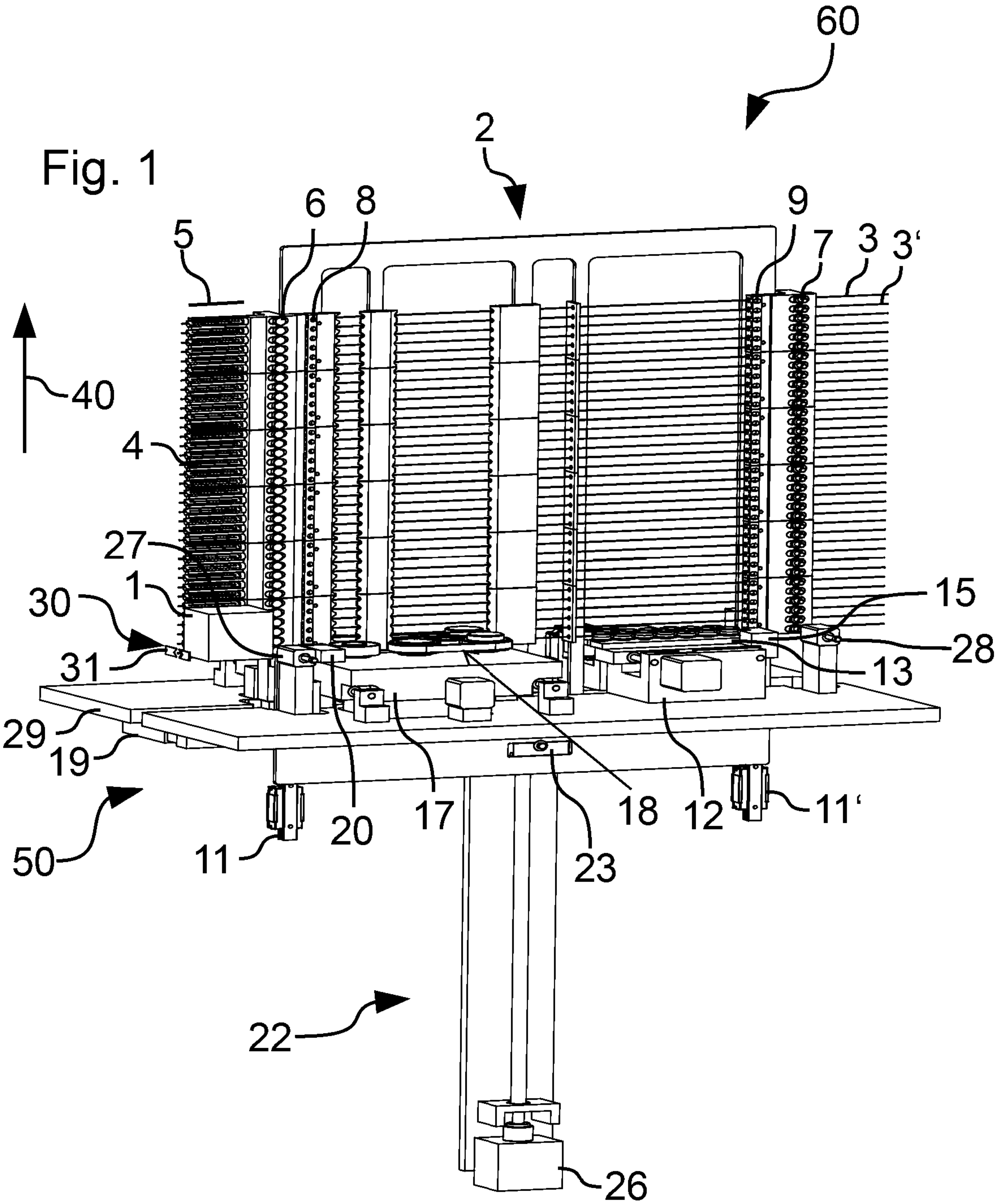
FIG. 1 is a perspective view of an embodiment of the cable changer according to the invention.
Figure 2:
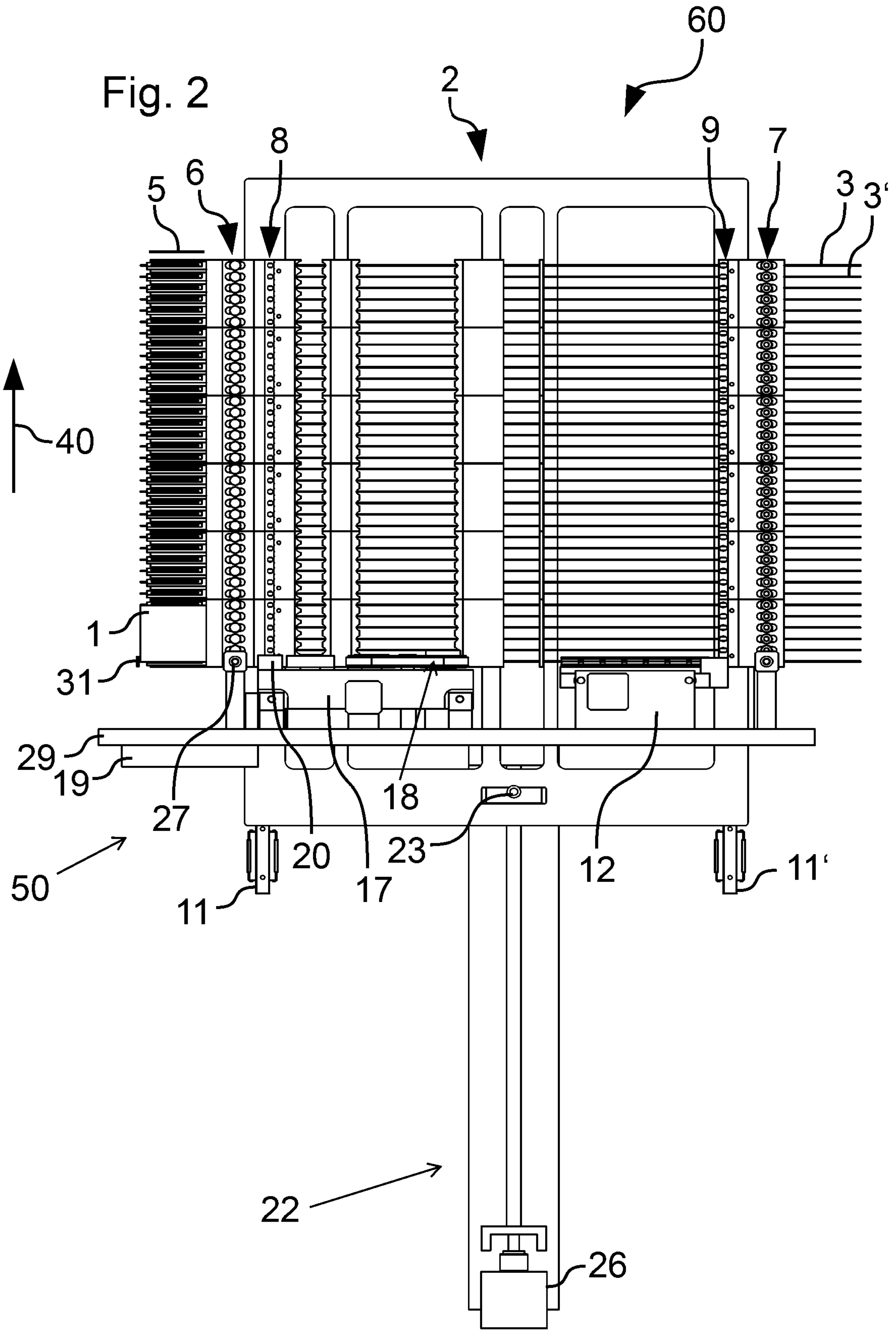
FIG. 2 is a side view of the cable changer from FIG. 1.
Figure 3:
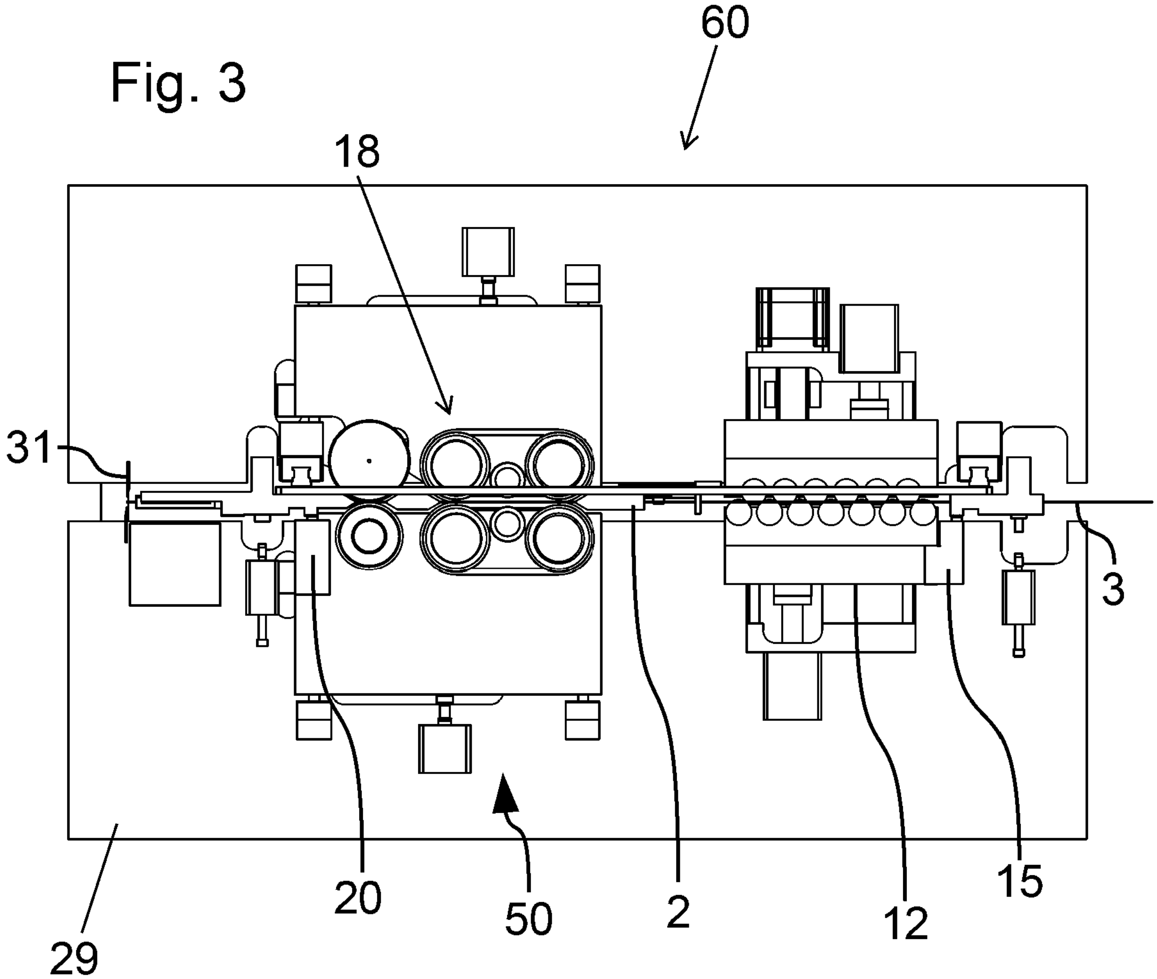
FIG. 3 is a plan view of the cable changer from FIG. 1 and/or FIG. 2.

FIG. 1 is a perspective view of an embodiment of the cable changer 60 according to the invention. FIG. 2 is a side view of the cable changer 60 from FIG. 1. FIG. 3 is a plan view of the cable changer 60 from FIG. 1 and/or FIG. 2.

The cable changer 60 comprises a cable guide 2 and a cable feed apparatus 50. The cable changer 60 allows for the production of partial cable harnesses having different cables 3, 3'. The cable changer 60 stores a plurality of different cables (e.g. different cross sections, insulation color, insulation material, etc.) in the cable guide 2, such that the cable 3, 3' required in each case can be automatically fed to the processing stations of a cable processing machine (e.g. crimping machine) (not shown) by means of the cable feed apparatus 50. It is also possible for two or more cables 3, 3' to be structurally equivalent to one another.

The remaining cables 3, 3' in the cable changer 60 or in the cable guide 2 are in each case secured for example by means of cable clamps 6, 7 in the cable guide 2. In order to feed a specific cable 3, 3' of the cable guide 2 to the processing stations of the cable processing machine, the cable changer 60 approaches the corresponding height position (position in the Z-direction 40; in FIG. 1 and/or FIG. 2 extending from bottom to top) of the cable guide 2, such that the cable feed apparatus 50 can feed the desired cable 3, 3' from the cable guide 2 to the cable processing machine.

The cable alignment unit and the cable drive 17 of the cable feed apparatus 50 are attached to the cable 3, 3'. The cable clamps 6, 7 of the desired cable 3, 3' are opened by means of motorized pins or pneumatic cylinders, such that the cable 3, 3' can be fed to the cable processing machine by means of the cable feed apparatus 50. The production of the single wire for the partial cable harness can begin thereafter.

In FIG. 1 and/or FIG. 2, the Z-direction 40 extends from bottom to top, and in FIG. 3 the direction extends out of the drawing plane. The selected cable 3, 3' is conveyed by the cable feed apparatus 50 from right to left in FIG. 1 and/or FIG. 2 and/or FIG. 3 and fed to a cable processing machine which is located to the left of the cable changer 60 shown in FIG. 1 and/or FIG. 2 and/or FIG. 3 (and is accordingly not shown in the drawings).

The cable changer 60 comprises a two-part base plate 29 for fastening the cable changer 60 to a machine frame or to the cable processing machine.

The cable guide 2 is height-adjustable, i.e. it can be moved along the Z-direction 40 and arranged at a plurality of height positions by means of a height adjustment apparatus 22. In order to change the height position, the cable guide 2 is moved up and/or down between the two-part base plate 29, by means of a motor 26 of the height adjuster. The height of the cable guide 2 is always the height relative to the cable feed apparatus 50. The cable guide 2 is guided in the Z-direction 40, along two guide rails 11, 11' that extend perpendicularly and so as to be mutually parallel.

In order to change the cable 3, 3' that is fed to the cable processing machine by means of the cable changer 60, a cable drive 17 for driving or conveying the cable 3, 3' of the cable feed apparatus 50, and a cable alignment station 12 for aligning the cable 3, 3' of the cable feed apparatus 50 are opened, such that the cable 3, 3' is released in each case. For this purpose, the two parts of the belt drive 18 of the cable drive 17 are moved apart, and the two parts of the straightening roller jaws 13 of the cable alignment station 12 are moved apart. At the same time, or shortly before or thereafter, the front cable clamp 6 and the rear cable clamp 7 of the cable 3, 3' are closed, such that the clamps firmly retain or firmly clamp the cable 3, 3' in each case.

The cable guide 2 can then be moved up and/or down between the two parts of the base plate 29 and/or the height of the cable guide relative to the cable feed apparatus 50 can be changed. The cable guide 2 is moved into a height position such that the cable 3, 3', that is to be fed to the cable processing machine is at the height of the cable alignment station 12 and the height of the cable drive 17.

When the cable 3, 3' is located at the desired height, i.e. the cable guide 2 is in the desired height position relative to the cable feed apparatus 50, the cable drive 17 and the cable alignment station 12 close.

Figure 4A:
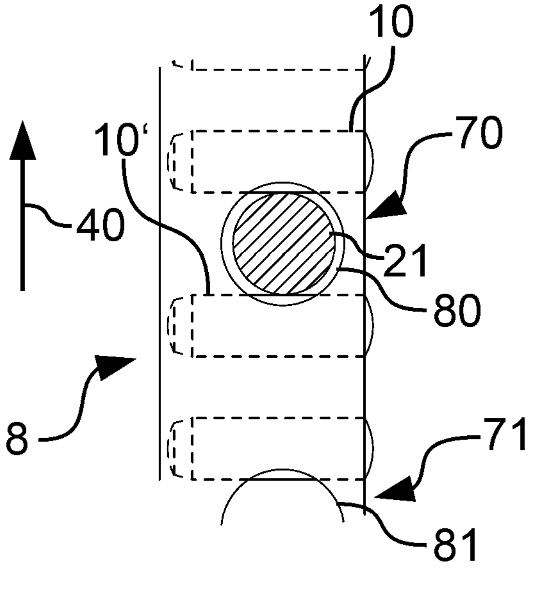
FIG. 4*a* shows a detail of the front position contours of the cable changer from FIG. 1 and/or FIG. 2 and/or FIG. 3.
Figure 4B:
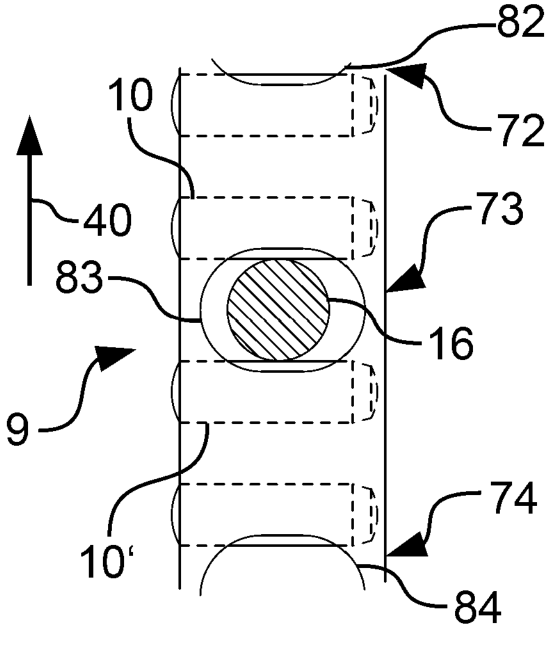
FIG. 4*b* shows a detail of the rear position contours of the cable changer from FIG. 1 and/or FIG. 2 and/or FIG. 3.

The cable guide 2 comprises height alignment elements 70-74 (FIGS. 4*a* and 4*b*), and the cable feed apparatus 50 comprises height determination elements 16, 21 (FIGS. 4*b* and 4*a* respectively). The height alignment elements 70-74 of the cable guide 2 are arranged along the Z-direction 40.

The cable guide 2 comprises front position contours 8 comprising height alignment elements 70-74 which are arranged closer to the side of the cable changer 60 towards which the cable 3, 3' is moved, and rear position contours 9 comprising height alignment elements 70-74 that are arranged closer to the side of the cable changer 60 away from which the cable 3, 3' is moved. The adjectives "front" and "rear" are therefore intended to be understood in relation to the cable feed apparatus, the cable conveying apparatus proceeding from right to left in FIG. 1 and/or FIG. 2 and/or FIG. 3.

The height alignment elements 70-74 are a plurality of recesses 80-84 that are arranged along the Z-direction 40 in two rows, specifically at the position of the front position contours 8 and at the position of the rear position contours 9. Precisely one height determination element 16, 21, respectively, can be inserted into each of the recesses 80-84.

The front position contours 8 comprise a plurality of recesses 80-84, as height alignment elements 70-74, in the cable guide 2, along the Z-direction 40. A recess 80-84 corresponding to the cable 3, 3' is located at each height of a cable 3, 3'. Locking the height determination element 16, 21 in the corresponding recess 80-84 positions the corresponding cable 3, 3' such that the cable is unclamped from the cable feed apparatus 50 (by activating the cable release means 27, 28 associated with the cable 3, 3', as a result of which the cable clamps 6, 7 for the cable 3, 3' are released), and moved by the cable feed apparatus 50, and/or passes through the cable alignment station 12 and is grasped by the cable drive 17 and can be moved or conveyed towards the cable processing machine. Shifting the height of the cable guide 2, and the subsequent locking, thus positions the cable 3, 3' such that the corresponding cable 3, 3' is or can be unclamped/released from the cable feed apparatus 50, i.e. the cable clamps 6, 7 for the cable 3, 3' are or can be in each case released by the cable release means 27, 28.

Two height alignment elements 70-74 are thus assigned to each cable 3, 3' of the cable guide 2: one height alignment element 70-74 at the position of the front position contours 8, and one height alignment element 70-74 at the position of the rear position contours 9.

The rear position contours 9 comprise a plurality of recesses 80-84, as height alignment elements 70-74, in the cable guide 2, along the Z-direction 40. The recesses 80-84 of the rear position contours 9 are located at the same height as the recesses 80-84 of the front position contours 8, such that the cable 3, 3' is aligned horizontally and/or so as to be in parallel with the surface of the base plate 29, when the cable guide 2 is locked to the cable feed apparatus 50 by means of the height determination elements 16, 21 and the height alignment elements 70-74. When the cable guide 2 is locked to the cable feed apparatus 50, the two height determination elements 16, 21 are in each case connected to two height alignment elements 70-74. In order to release the locking, the connections are released or separated.

When the cable guide 2 is locked to the cable feed apparatus 50, one cable 3, 3' of the cable guide 2 can be fed to the cable processing machine by means of the cable feed apparatus 50. For this purpose, the front cable clamps 6 and the rear cable clamps 7 are opened by the corresponding cable release means 27, 28 (e.g. pneumatic cylinders).

The cable feed apparatus 50 comprises a labeling means 1 or a labeling head which labels the outer surface or a portion of the outer surface of the cable 3, 3', for example by means of a laser.

The labeling means 1 labels the cable 3, 3' in a labeling region 5, the labeling region 5 being located behind the front position contours 8 and behind the front cable clamps 6 when viewed in the cable feed direction. That is to say that, in FIG. 1 and/or in FIG. 2, the labeling region 5 is arranged to the left of the front cable clamps 6, the cable feed direction extending from right to left.

On the side of the front cable clamps 6 remote from the rear cable clamps 7, the cable guide 2 comprises cable routing 4 for each cable 3, 3'. The labeling region 5 corresponds to the region over which the relevant cable routing 4 extends, in the cable feed direction.

Since the height position or the height of the cable 3, 3' is particularly precise, owing to the locking of the cable guide 2 to the cable feed apparatus 50, the labeling means 1 can write on the outer surface of the cable 3, 3', which is fed to the cable processing apparatus by means of the cable feed apparatus 50, particularly precisely and so as to be easy for a person to read. In particular, the labeling means 1 can write on the cable 3, 3' such that the labeling extends along the longitudinal axis of the cable 3, 3' (the longitudinal axis of the cable 3, 3' extends along the greatest extension or dimension of the cable 3, 3' or along the cable feed direction). This facilitates human reading of the labeling and machine reading of the labeling.

In particular, cables 3, 3' having a very small diameter, e.g. of less than approximately 2 mm, can also be labelled by the labeling means 1 such that a person can read the labeling easily and/or without technical aids.

FIG. 4*a* shows a detail of the front position contours 8 of the cable changer 60 from FIG. 1 and/or FIG. 2 and/or FIG. 3. FIG. 4*b* shows a detail of the rear position contours 9 of the cable changer 60 from FIG. 1 and/or FIG. 2 and/or FIG. 3.

In FIG. 4*a*, a front height alignment element 70 can be seen in its entirety, and a further front height alignment element 71 that is located, in FIG. 4*a*, below the entirely visible front height alignment element 70 can be seen only in part. In FIG. 4*b*, a rear height alignment element 73 can be seen in its entirety, and two further front height alignment elements 72, 74 can be seen only in part, one of the two rear height alignment elements 72, 74 that are visible in part being located above the entirely visible rear height alignment element 73, and one of the two rear height alignment elements 72, 74 that are visible in part being located below the entirely visible rear height alignment element 73.

The height alignment elements 70-74 of the cable guide 2 of the front position contours 8 and of the rear position contours 9 each comprise a plurality of cylindrical pins 10, 10' that are aligned horizontally and/or aligned so as to be in parallel with the cable feed direction. The cylindrical pins 10, 10' are arranged so as to be mutually equidistant along the Z-direction 40, such that the height alignment elements 70-74 are mutually equidistant along the Z-direction 40 of the front position contours 8, and such that the height alignment elements 70-74 are mutually equidistant along the Z-direction 40 of the rear position contours 9.

The smallest spacing between two cylindrical pins 10, 10' in each case corresponds, in each case, to the diameter of a height determination element 16, 21 of the cable feed apparatus 50. As shown in FIG. 4*a* and/or FIG. 4*b*, the outer surface of the relevant height determination element 16, 21 contacts a lower end of an upper cylindrical pin 10 and an upper end of a lower cylindrical pin 10' of the cable guide 2 or of the front position contours 8 and of the rear position contours 9. As a result, the height position of the cable guide 2 relative to the cable feed apparatus 50 is precisely specified when the cable guide 2 is locked to the cable feed apparatus 50 by means of the height alignment elements 70-74 of the front position contours 8 and the height alignment elements 70-74 of the rear position contours 9.

For the purpose of locking, a first height determination element 16, 21 of the cable feed apparatus 50 is inserted into a recess 80-84 between two cylindrical pins 10, 10' of the front position contours 8, i.e. in a height alignment element 70-74, and a second height determination element 16, 21 of the cable feed apparatus 50 is inserted into a recess 80-84 between two cylindrical pins 10, 10' of the rear position contours 9, i.e. in a height alignment element 70-74 (into the drawing plane, in FIG. 4*a* and/or 4*b*). The movement of the height determination elements 16, 21 can be performed for example by means of closing the cable drive 17 and the cable alignment station 12, when one of the height determination elements 16 is part of the cable drive 17 (e.g. the belt drive 18) and the other height determination element 21 of the height determination elements 16, 21 is part of the cable alignment station 12 (e.g. the straightening roller jaws 13).

The cable guide 2 is also locked laterally, relative to the cable feed apparatus 50, it being possible for slight play to be provided, however. In each case, the height determination elements 16, 21 are prevented from slipping laterally out of the height alignment elements 70-74 (to the right or left in FIG. 4*a* and/or FIG. 4*b*).

Two recesses 80-84 of the front position contours 8 and three recess 80-84 of the rear position contours 9 are shown and/or shown in part in FIG. 4*a* and/or FIG. 4*b*. The recesses 80-84 of the front position contours 8 are circular in cross section. The recesses 80-84 of the rear position contours 9 are elliptical in cross section.

FIG. 1 and/or FIG. 3 show that the cable alignment station 12 comprises a rear positioning pin retainer 15 having a first height determination element 16, and the cable drive 17 comprises a front positioning pin retainer 20 comprising a second height determination element 21. Overall, the cable feed apparatus 50 comprises exactly two height determination elements 16, 21 which are both located on the same side of the cable guide 2.

The cylindrical pins 10, 10' each have a cylindrical shape, at least in the center thereof, the height of the cylindrical shape extending from right to left or vice versa.

When the height determination element 16, 21 is inserted into the height alignment element 70-74, i.e. into the recess 80-84, the relevant height determination element 16, 21 can slide over the lateral surface of the relevant cylindrical pin 10, 10' until the relevant height determination element 16, 21 has slid or slipped into the cut-out or recess 80-84, between two cylindrical pins 10, 10', that fits precisely in the Z-direction 40. During the slipping or sliding over the lateral surface of the relevant cylindrical pin 10, 10', the height of the cable guide 2 relative to the cable feed apparatus 50 may change slightly.

The height determination elements 16, 21 are in each case formed so as to be complementary to the height determination elements 70-74, such that the relevant diameter of the height alignment elements 70-74 in the Z-direction corresponds to the relevant diameter of the height determination elements 16, 21 in the Z-direction, and/or that the diameters are of the same size.

When the two height determination elements 16, 21 are each in a recess 80-84 or cut-out between two cylindrical pins 10, 10', i.e. in a height alignment element 70-74, the cable guide 2 is precisely locked and/or aligned at a specified height, relative to the cable feed apparatus 50.

The height determination elements 16, 21 each have a cylindrical shape, i.e. the cross section along a plane that contains the Z-direction 40 is circular, as is shown in FIG. 4*a* and/or FIG. 4*b*. It is also conceivable for the height determination elements 16, 21 to have a shape that tapers towards the free end thereof.

In order to release the locking, the two height determination elements 16, 21 are moved out of the relevant recess 80-84 or cut-out between two cylindrical pins 10, 10', or out of the height alignment element 70-74 (out of the drawing plane, in FIG. 4*a* and/or FIG. 4*b*), e.g. by opening the cable drive 17 or the belt drive 18 and the cable alignment station 12 or the roller jaws 13. The locking is thus released by releasing the connection between the height determination elements 16, 21 and the height alignment elements 70-74.

The height position of the cable guide 2 relative to the cable feed apparatus 50 can then be changed, such that another cable 3, 3' is at such a height that the cable is fed to the cable processing machine by means of the cable feed apparatus 50, and optionally labelled by the labeling means 1. For this purpose, the height of the cable guide 2 is moved, such that height alignment elements 70-74 of the cable guide 2 that correspond to the desired cable 3, 3' are substantially at the same height as the height determination elements 16, 21, such that the height alignment elements 70-74 for the desired cable 3, 3' are inserted into the height determination elements 16, 21 upon locking. That is to say that there is only a small discrepancy between the height initially set by the height adjustment apparatus 22 and the relative height actually provided after locking, between the cable guide 2 and the cable feed apparatus 50, which discrepancy is reduced virtually to zero by means of the height determination elements 16, 21 sliding or slipping over the lateral surface of the cylindrical pins 10, 10'. Following locking, the cable 3, 3' is located precisely at a specified height relative to the cable feed apparatus 50 in which the cable 3, 3' can be grasped by the cable drive 17 and by the cable alignment station 12.

The lateral surface of the cylindrical pins 10, 10' is hardened. The cylindrical pins 10, 10' can be pressed into the cable guide 2. In particular, the cylindrical pins 10, 10' can be pressed sufficiently deeply into the cable guide 2 that the lateral surface of the relevant cylindrical pin 10, 10' terminates in a planar manner with the remaining surface of the cable guide 2. The cylindrical pins 10, 10' may consist for example of a metal and/or a metal alloy, e.g. steel.

The height determination elements 16, 21 are in each case a pin-shaped projection. The position in the Z-direction 40 or the height position of the height determination elements 16, 21 can in each case be finely adjusted manually, i.e. the height position thereof relative to the cable feed apparatus 50 can be slightly changed (e.g. by less than approximately 10 mm) manually.

The height determination elements 16, 21 of the cable feed apparatus 50 are located on just one side of the cable guide 2. In FIG. 1 and/or FIG. 2, the height determination elements 16, 21 are thus both located on the front side of the cable guide 2. As a result, over determination of the height position of the cable guide 2 is prevented, and therefore the emergence of mechanical stresses is prevented.

The cable drive 17 and the cable alignment station 12 each comprise a symmetry compensation means 19 in order to align the elements of the cable drive 17 (in particular the belt drive 18) and/or the elements of the cable alignment station 12 (in particular the straightening roller jaws 13) so as to be symmetrical with respect to the cable.

The cable alignment station 12 furthermore comprises a spacing regulation means for adapting the spacing between the straightening roller jaws 13 to the diameter of the cable 3, 3' that is conveyed or moved by means of the cable feed apparatus 50.

On the side of the labeling means 1 remote form the cable drive 17, the cable feed apparatus 50 comprises a cable separating means 30 having a blade 31 for cutting or cutting through the cable 3, 3' that is fed to the cable processing machine.

Figure 5:
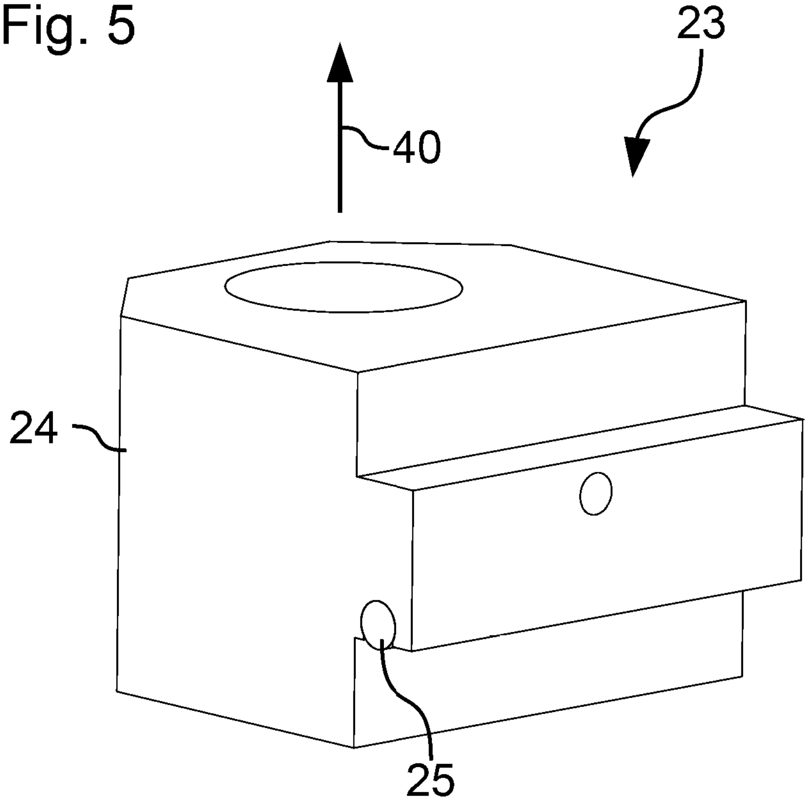
FIG. 5 is a perspective view of the compensation connection element of the cable changer from FIG. 1 and/or FIG. 2 and/or FIG. 3.

FIG. 5 is a perspective view of the compensation connection element 23 of the cable changer 60 from FIG. 1 and/or FIG. 2.

The cable changer 60 and/or the cable guide 2 in addition comprises a compensation connection element 23. The compensation connection element 23 is part of the height adjustment apparatus 22 of the cable guide 2. The slight discrepancies between the height of the cable guide 2 relative to the cable feed apparatus 50 that is set by the height adjustment apparatus 22, and the height of the cable guide 2 relative to the cable feed apparatus 50 when the height determination elements 16, 21 were inserted into the height alignment elements 70-74 (i.e. when the state shown in FIG. 4*a* and FIG. 4*b* is assumed), is compensated by the compensation connection element 23, such that no mechanical stresses arise outside the compensation connection element 23.

The compensation connection element 23 comprises a spindle nut 24 and, on the lower faces thereof, an elastomer member 25 as a compensation element. The elastomer member 25 may consist of a rubber and/or a foam for example.

The elastomer member 25 can be reversibly compressed. That is to say that, after compression has taken place, the elastomer member 25 assumes its original shape again when the acting force is removed.

Compressing the elastomer member 25 compensates the height difference between the set height position by the height adjustment apparatus 22 (prior to locking) and the actual height position in the locked state, in that the elastomer member 25 is optionally compressed by the forces that arise. In this manner, bending and/or material fatigue of the cable guide 2 and the remaining parts of the cable changer 60 is substantially prevented.

The elastomer member 25 can in particular be cylindrical, the greatest extension of the elastomer member 25 being in the cable feed direction.

It should finally be noted that terms such as "comprising," "having," etc. do not exclude any other elements or steps, and terms such as "a" or "an" do not exclude a plurality. It should furthermore be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 labeling means
2 cable guide
3, 3' cable
4 cable routing
5 labeling region
6 front cable clamps
7 rear cable clamps
8 front position contours
9 rear position contours
10, 10' cylindrical pin
11, 11' guide rails in the Z-direction
12 cable alignment station
13 straightening roller jaws
15 rear positioning pin retainer comprising positioning pin
16 rear height determination element
17 cable drive
18 two-part belt drive
19 symmetry compensation means
20 front positioning pin retainer comprising positioning pin
21 front height determination element
22 height adjustment apparatus
23 compensation connection element
24 spindle nut
25 elastomer member
26 motor of the height adjustment apparatus
27 front cable release means
28 rear cable release means
29 two-part base plate
30 cable separating means
31 blade
40 Z-direction
50 cable feed apparatus
60 cable changer
70, 71 front height alignment element
72-74 rear height alignment element
80-84 recess

What is claimed is:

1. A cable changer comprising:

a cable guide for retaining a plurality of cables at different heights; and a cable feed apparatus for feeding one of the cables of the cable guide to a cable processing machine, a height of the cable guide relative to the cable feed apparatus being adjustable, such that the cable feed apparatus can feed different ones of the cables of the cable guide to the cable processing machine, depending on the height of the cable guide relative to the cable feed apparatus, wherein the cable guide includes height alignment elements and the cable feed apparatus includes height determination elements that are complementary to the height alignment elements, and wherein the height alignment elements and the height determination elements are adapted to lock the cable guide at each of a plurality of specified heights relative to the cable feed apparatus when the height determination elements are connected to some of the height alignment elements.

2. The cable changer according to claim 1 wherein the height alignment elements of the cable guide include a plurality of recesses arranged at different heights, and the height determination elements of the cable feed apparatus include two projections adapted to engage the recesses.

3. The cable changer according to claim 2 wherein a height of each of the recesses is limited by two cylindrical pins, and wherein the cable guide is locked to the cable feed apparatus at one of the specified heights when the each of the projections is received between the two cylindrical pins of one of the recesses.

4. The cable changer according to claim 1 wherein the cable feed apparatus includes a labeling head for labeling the one cable that is fed from the cable feed apparatus to the cable processing machine.

5. The cable changer according to claim 1 wherein the cable guide includes a reversibly compressible compensation connection element, the compensation connection element being adapted and arranged to compensate for height differences between the cable guide and the cable feed apparatus when locking the cable guide to the cable feed apparatus.

6. The cable changer according to claim 5 wherein the compensation connection element includes an elastomer member.

7. The cable changer according to claim 1 wherein the height alignment elements and the height determination elements are arranged on only one side of the cable guide.

8. The cable changer according to claim 1 wherein the height determination elements of the cable feed apparatus are arranged at two mutually spaced positions, and including a height adjustment apparatus for changing the height of the cable guide relative to the cable feed apparatus, when the height determination elements are not connected to the height alignment elements, being arranged between the two mutually spaced positions.

9. The cable changer according to claim 1 wherein one of the height determination elements is part of a cable alignment station of the cable feed apparatus for aligning the one cable, and another of the height determination elements is part of a cable drive for conveying the one cable, wherein the height determination elements are connected to some of the height alignment elements in a closed state of at least one of the cable alignment station and the cable drive whereby the cable guide is locked to the cable feed apparatus with respect to the height of the cable drive relative to the cable feed apparatus.

10. The cable changer according to claim 1 wherein front height alignment elements of the height alignment elements and rear height alignment elements of the height alignment elements are arranged between front cable clamps for clamping a portion of the one cable and rear cable clamps for clamping a portion of the one cable.

11. A method for locking a cable guide at a selected height relative to a cable feed apparatus, wherein the cable guide retains a plurality of cables at different heights, wherein a height of the cable guide relative to the cable feed apparatus is adjustable such that the cable feed apparatus can feed different cables of the cable guide to a cable processing machine depending on the selected height of the cable guide relative to the cable feed apparatus, the method comprising the steps of:

setting the height of the cable guide relative to the cable feed apparatus; and connecting height determination elements of the cable feed apparatus to height alignment elements of the cable guide to lock the cable guide at the set height relative to the cable feed apparatus.

12. The method according to claim 11 further comprising connecting the height determination elements to the height alignment elements by closing straightening roller jaws of a cable alignment station of the cable feed apparatus and by closing a cable drive of the cable feed apparatus.

13. The method according to claim 11 further comprising labeling a one of the cables at the set height using a labeling means of the cable feed apparatus prior to the one cable being fed to the cable processing machine.

* * * * *